(12) United States Patent
Dong et al.

(10) Patent No.: US 11,556,022 B2
(45) Date of Patent: Jan. 17, 2023

(54) LIQUID CRYSTAL DISPLAY DEVICE

(71) Applicants: Hefei BOE Display Technology Co., Ltd., Anhui (CN); BOE Technology Group Co., Ltd., Beijing (CN)

(72) Inventors: Wenbo Dong, Beijing (CN); Jianming Liu, Beijing (CN); Wei Kang, Beijing (CN); Chaoyue Wang, Beijing (CN)

(73) Assignees: Hefei BOE Display Technology Co., Ltd., Hefei (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/468,584

(22) Filed: Sep. 7, 2021

(65) Prior Publication Data
US 2022/0236604 A1    Jul. 28, 2022

(30) Foreign Application Priority Data

Jan. 22, 2021    (CN) .......................... 202110087856.7

(51) Int. Cl.
G02F 1/1333    (2006.01)
G02F 1/1335    (2006.01)
G02F 1/13357   (2006.01)

(52) U.S. Cl.
CPC .... *G02F 1/133317* (2021.01); *G02F 1/13332* (2021.01); *G02F 1/133314* (2021.01);
(Continued)

(58) Field of Classification Search
CPC ......... G02F 1/133524; G02F 1/133606; G02F 2202/28; G02F 1/133322; G02F 1/133308;
(Continued)

(56) References Cited

U.S. PATENT DOCUMENTS

2010/0302717 A1* 12/2010 Oh .................... G02F 1/133308
                                                    361/679.01
2013/0293804 A1* 11/2013 Kim ................... G02F 1/133308
                                                    349/58
(Continued)

FOREIGN PATENT DOCUMENTS

CN    208488914 U    2/2019
CN    110161751 A    8/2019
(Continued)

*Primary Examiner* — Jia X Pan
(74) *Attorney, Agent, or Firm* — IPro, PLLC

(57) ABSTRACT

The embodiments of the present disclosure provide a liquid crystal display device. The liquid crystal display device includes: a display panel, including a display region and a non-display region surrounding the display region; a back plate, arranged opposite to the display panel, where the back plate comprises a bottom wall and a side wall extending from the bottom wall to one side of the display panel; a backlight source, arranged between the display panel and the back plate, where the backlight source comprises a light source arranged on the bottom wall of the back plate and a diffusion plate arranged on a light emitting side of the light source; and a middle frame, where the middle frame comprises a first support part, and a second support part connected with one side, deviating from the display panel, of the first support part.

11 Claims, 5 Drawing Sheets

(52) U.S. Cl.
CPC .. *G02F 1/133524* (2013.01); *G02F 1/133606* (2013.01); *G02F 2202/28* (2013.01)

(58) Field of Classification Search
CPC ........... G02F 1/13332; G02F 1/133314; G02F 1/133317
See application file for complete search history.

(56) References Cited

U.S. PATENT DOCUMENTS

| | | | | |
|---|---|---|---|---|
| 2017/0123259 | A1* | 5/2017 | Kim | G02F 1/133308 |
| 2017/0322361 | A1* | 11/2017 | Park | G02F 1/133603 |
| 2019/0204684 | A1* | 7/2019 | Yoon | G02F 1/133606 |
| 2020/0218308 | A1 | 7/2020 | Li et al. | |

FOREIGN PATENT DOCUMENTS

| | | |
|---|---|---|
| CN | 110727376 A | 1/2020 |
| CN | 111245982 A | 6/2020 |

* cited by examiner

LIQUID CRYSTAL DISPLAY DEVICE

The present application claims the priority from Chinese Patent Application No. 202110087856.7, filed with the Chinese Patent Office on Jan. 22, 2021, and entitled "LIQUID CRYSTAL DISPLAY DEVICE", which is hereby incorporated by reference in its entirety.

FIELD

The present disclosure relates to the technical field of display, in particular to a liquid crystal display device.

BACKGROUND

A liquid crystal display (LCD) has numerous advantages of thin body, power saving, and no radiation, and is widely used in electronic products such as televisions, computers, and mobile phones. The LCD is a passive light-emitting display, and its display screen itself cannot emit light, but is illuminated by a backlight module behind the display screen.

At present, a "full screen" has become a standard configuration in the mobile phone circle, and an extremely high screen-to-body ratio can bring users a wide field of vision. The full screen is not only suitable for mobile phones, smart TVs have upgraded over many years, the body frame have evolved from a few centimeters in width to a few millimeters, and TVs with a high screen-to-body ratio have gradually entered the consumer level field.

SUMMARY

The embodiments of the present disclosure provide a liquid crystal display device, including:

a display panel, including a display region and a non-display region surrounding the display region;

a back plate, arranged opposite to the display panel, where the back plate includes a bottom wall and a side wall extending from the bottom wall to one side of the display panel;

a backlight source, located between the display panel and the back plate, where the backlight source includes a light source arranged on the bottom wall of the back plate and a diffusion plate arranged on a light emitting side of the light source; and a middle frame, where the middle frame includes a first support part, and a second support part connected with one side, deviating from the display panel, of the first support part; and the non-display region of the display panel is fixedly connected with the first support part by a first adhesive layer; where the second support part includes a first sub-support part connected with one side, deviating from the display panel, of the first support part; a second sub-support part connected with a side edge, facing the light source, of the first sub-support part; and an avoidance part connected with a side edge, deviating from the first sub-support part, of the second sub-support part; where an accommodation space is formed between the first sub-support part and the avoidance part, and the side wall of the back plate is accommodated in the accommodation space; the first support part and the second sub-support part form a first step structure, and a maximum distance between the top of the avoidance part and the surface of the bottom wall of the back plate is less than a maximum distance between the top of the second sub-support part and the surface of the bottom wall of the back plate; and an edge region of the diffusion plate is fixed on the second sub-support part.

Optionally, in the above liquid crystal display device provided by the embodiments of the present disclosure, the liquid crystal display device further includes a light guide strip; where the light guide strip is located between the diffusion plate and the second sub-support part; the cross section shape of the avoidance part is rectangular, and the avoidance part and the second sub-support part form a second step structure; and the light guide strip is configured to diffuse and guide light emitted by the light source to the edge of the display region of the display panel.

Optionally, in the above liquid crystal display device provided by the embodiments of the present disclosure, the light guide strip is connected with the second sub-support part by a first optically clear adhesive, and the light guide strip is connected with the diffusion plate by a second optically clear adhesive.

Optionally, in the above liquid crystal display device provided by the embodiments of the present disclosure, the liquid crystal display device further includes a light guide strip; where the light guide strip is located between the diffusion plate and the first support part; the cross section of the avoidance part is a right triangle, and the inclined plane of the right triangle is close to the light source; and the light guide strip is configured to diffuse and guide light emitted from the diffusion plate to the edge of the display region of the display panel.

Optionally, in the above liquid crystal display device provided by the embodiments of the present disclosure, the light guide strip is connected with the first support part by a first optically clear adhesive, and the light guide strip is connected with the diffusion plate by a second optically clear adhesive.

Optionally, in the above liquid crystal display device provided by the embodiments of the present disclosure, the back plate further includes a third support part connected with the side wall, the third support part is arranged parallel to the bottom wall, and the third support part is located at the bottom of the first sub-support part;

the liquid crystal display device further includes an outer frame, where the outer frame is fixedly connected with the side edge of the display panel by a second adhesive layer, and the second adhesive layer has iron powder; and the liquid crystal display device further includes a magnetic strip, where the magnetic strip is fixed on the third support part, and the magnetic strip is configured to have an attractive force to the iron powder within the second adhesive layer.

Optionally, in the above liquid crystal display device provided by the embodiments of the present disclosure, the magnetic strip is located on one side, deviating from the first sub-support part, of the third support part; and a bottom surface of the magnetic strip is flush with a bottom surface of the bottom wall of the back plate.

Optionally, in the above liquid crystal display device provided by the embodiments of the present disclosure, the magnetic strip is located between the third support part and the first sub-support part, and a bottom surface of the third support part is flush with a bottom surface of the bottom wall of the back plate.

Optionally, in the above liquid crystal display device provided by the embodiments of the present disclosure, the liquid crystal display device further includes an outer frame; an inner wall, facing the display panel, of the outer frame has light shielding foam; a side edge of one side, facing the outer frame, of the display panel has a side sealant; and the outer frame is fixedly connected with the side edge of the display panel by the light shielding foam and the side sealant.

Optionally, in the above liquid crystal display device provided by the embodiments of the present disclosure, the middle frame and the outer frame are an integrated structure.

Optionally, in the above liquid crystal display device provided by the embodiments of the disclosure, a position where the side wall of the outer frame is in lap joint with the top of the first support part has a groove, and the first adhesive layer is located within the groove.

Optionally, in the above liquid crystal display device provided by the embodiments of the present disclosure, the groove is arc-shaped.

DETAILED DESCRIPTION OF THE EMBODIMENTS

Figure 1:
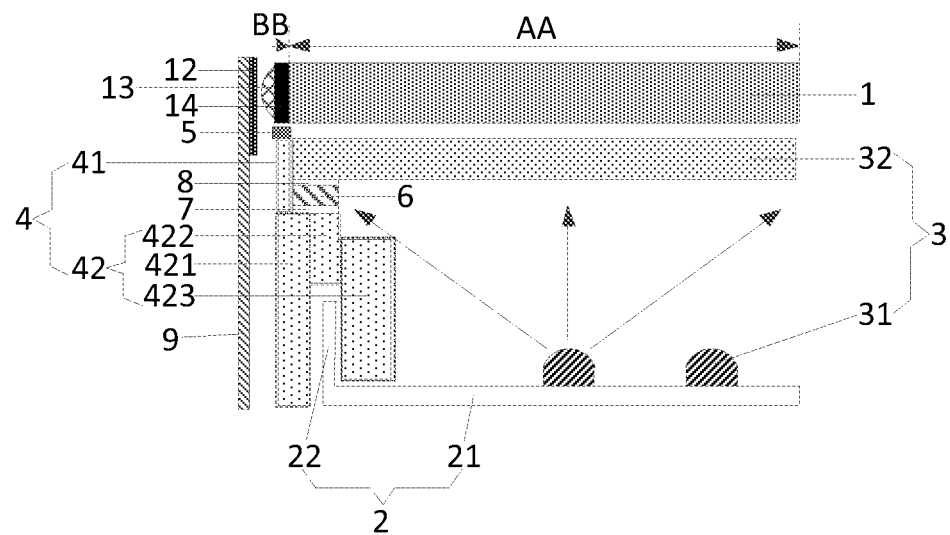
FIG. 1 is a structural schematic diagram of a liquid crystal display device provided by the embodiments of the present disclosure.

In order to make the objects, technical solutions and advantages of the embodiments of the present disclosure more clear, the technical solutions of the embodiments of the present disclosure will be clearly and completely described below in conjunction with the accompanying drawings of the embodiments of the present disclosure. Obviously, the described embodiments are part of the embodiments of the present disclosure, rather than all of the embodiments. And the embodiments of the present disclosure and the features in the embodiments may be combined with each other without conflict. Based on the described embodiments of the present disclosure, all other embodiments obtained by those of ordinary skill in the art without inventive effort fall within the scope of protection of the present disclosure.

Unless otherwise defined, the technical or scientific terms used in the present disclosure should have the general meanings understood by those of ordinary skill in the art to which the present disclosure belongs. Similar terms such as "including" or "comprising" used in the present disclosure mean that elements or objects appearing before the term encompass elements or objects listed after the term and equivalents thereof, without excluding other elements or objects. Similar terms such as "connection" or "connected" are not limited to physical or mechanical connections, but can include electrical connections, whether direct or indirect. "Inner", "outer", "upper", "lower" and the like are only used to indicate relative positional relationships, which may change accordingly when the absolute positions of the described objects change.

It should be noted that the size and shape of each figure in the drawings do not reflect the true scale, and the purpose is only to schematically illustrate the contents of the present disclosure. And the same or similar reference signs throughout represent the same or similar elements or elements having the same or similar function.

Although some TVs are known as a full screen at present due to a narrow bezel, in fact, it is easier to find thick black edges around, and the bezel is not as narrow as expected. A real full-screen TV has a very narrow bezel, which can be almost ignored if you don't look carefully, and the integrated visual effect is obvious.

However, compared with mobile phones, due to an extremely narrow black matrix (BM) area at the edge of the screen, the technical difficulties of the real full-screen TV are much greater. Not only does an internal driving circuit and a peripheral packaging design need to be rearranged in the panel design, but also further breakthroughs need to be made in the screen fitting and assembly technology. Therefore, the real full-screen TV is rare in the market at present.

At present, the BM width of the edge of the full-screen LCD developed and mass-produced is only 0.5-0.9 mm. During screen fitting and assembly, the edge of the panel and the support surface of the middle frame are generally bonded together by the transparent ultraviolet rays (UV) glue. Because the transparent UV glue has certain fluidity, a part of the glue will enter the effective display region of the panel, resulting in the pixels in the effective display region of the display edge of the LCD screen being blocked. In addition, in the promotion of full-screen LCD products, the fitting and matching of the full screen and client backlight source is also an urgent problem to be solved.

Figure 2:
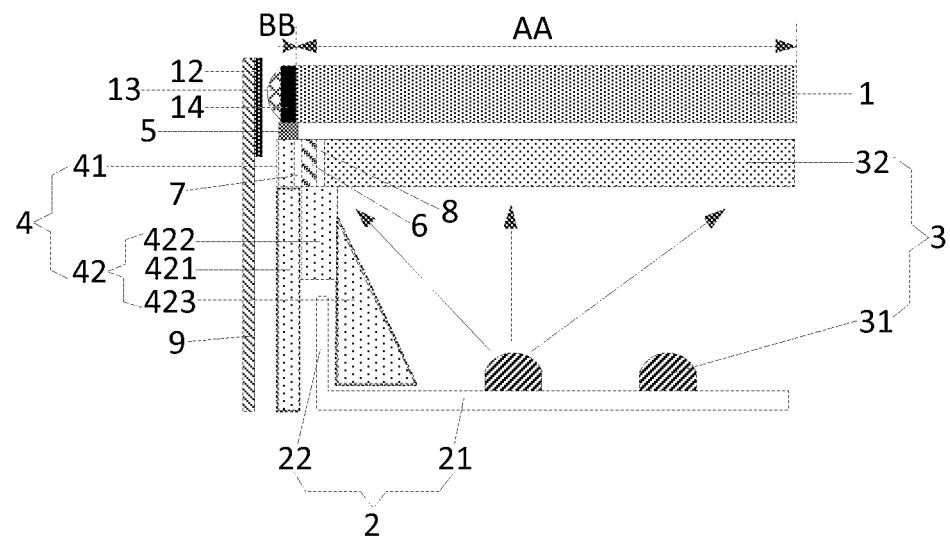
FIG. 2 is a structural schematic diagram of another liquid crystal display device provided by the embodiments of the present disclosure.

The embodiments of the present disclosure provide a liquid crystal display device, as shown in FIGS. 1 and 2, and including:

a display panel 1, including a display region AA and a non-display region BB surrounding the display region AA; and only part of the display region AA and part of the non-display region BB are illustrated in the embodiments of the present disclosure;

a back plate 2, arranged opposite to the display panel 1, where the back plate 2 includes a bottom wall 21 and a side wall 22 extending from the bottom wall 21 to one side of the display panel 1;

a backlight source 3, located between the display panel 1 and the back plate 2, where the backlight source 3 includes a light source 31 arranged on the bottom wall 21 of the back plate 2 and a diffusion plate 32 arranged on a light emitting side of the light source 31; and a middle frame 4, where the middle frame 4 includes a first support part 41, and a second support part 42 connected with one side, deviating from the display panel 1, of the first support part 41; and the non-display region BB of the display panel 1 is fixedly connected with the first support part 41 by a first adhesive layer 5; where the second support part 42 includes a first sub-support part 421 connected with one side, deviating from the display panel 1, of the first support part 41; a second sub-support part 422 connected with a side edge, facing the light source 31, of the first sub-support part 421; and an avoidance part 423 connected with a side edge, deviating from the first sub-support part 421, of the second sub-support part 422; where an accommodation space is formed between the first sub-support part 421 and the avoidance part 423, and the side wall 22 of the back plate 2 is accommodated in the accommodation space, so that the back plate 2 and the middle frame 4 can be firmly attached; the first support part 41 and the second sub-support part 422 form a first step structure, and a maximum distance between the top of the avoidance part 423 and the surface of the bottom wall 21 of the back plate 2 is less than a maximum distance between the top of the second sub-support part 422 and the surface of the bottom wall 21 of the back plate 2; and an edge region of the diffusion plate 32 is fixed on the second sub-support part 422.

According to the liquid crystal display device provided by the embodiments of the present disclosure, by optimizing the structure of the middle frame 4, i.e. forming the first step structure by the first support part 41 and the second sub-support part 422, and arranging the avoidance part 423 for avoiding light emitted by the backlight source 3 so that the light emitted by the backlight source 3 is incident to the edge region of the diffusion plate 32, light rays emitted by the light source 31 can be made to effectively reach the edge of a module, thereby avoiding the problem that the light rays are blocked.

In specific implementation, in the above liquid crystal display device provided by the embodiments of the present disclosure, as shown in FIG. 1, the liquid crystal display device further includes a light guide strip 6, where the light guide strip 6 is located between the diffusion plate 32 and the second sub-support part 422, the cross section shape of the avoidance part 423 is rectangular, and the avoidance part 423 and the second sub-support part 422 form a second step structure; and the light guide strip 6 is configured to diffuse and guide light emitted by the light source 31 to the edge of the display region AA of the display panel 1. In this way, the first step structure formed by the first support part 41 and the second sub-support part 422 and the second step structure formed by the avoidance part 423 and the second sub-support part 422 constitute a double step, so that the light rays emitted by the light source 31 can be guided to the edge of the display region AA of the display panel 1, the light rays emitted by the light source 31 are prevented from being blocked, and the problem that edge pixels of the display region AA of the display panel 1 are blocked so as to result in edge darkening is solved. In addition, the arrangement of the light guide strip 6 of the present disclosure can further effectively disperse light rays at the edge of the display region AA, and under the condition that the light rays at the edge of the display region AA are sufficient, the light rays at the edge of the display region AA are not too bright.

In specific implementation, in the above liquid crystal display device provided by the embodiments of the present disclosure, as shown in FIG. 1, the light guide strip 6 is connected with the second sub-support part 422 by a first optically clear adhesive 7, and the light guide strip 6 is connected with the diffusion plate 32 by a second optically clear adhesive 8.

In specific implementation, in the above liquid crystal display device provided by the embodiments of the present disclosure, as shown in FIG. 2, the liquid crystal display device further includes a light guide strip 6, where the light guide strip 6 is located between the diffusion plate 32 and the first support part 41, the cross section of the avoidance part 423 is a right triangle, and the inclined plane of the right triangle is close to the light source 31; and the light guide strip 6 is configured to diffuse and guide light emitted from the diffusion plate 32 to the edge of the display region AA of the display panel 1. In this way, the avoidance part 423 can guide the light rays emitted by the light source 31 to the edge of the display region AA of the display panel 1, the light rays emitted by the light source 31 are prevented from being blocked, and the problem that edge pixels of the display region AA of the display panel 1 are blocked so as to result in edge darkening is solved. In addition, the arrangement of the light guide strip 6 of the present disclosure can further effectively disperse light rays at the edge of the display region AA, and under the condition that the light rays at the edge of the display region AA are sufficient, the light rays at the edge of the display region AA are not too bright.

In specific implementation, in the above liquid crystal display device provided by the embodiments of the present disclosure, as shown in FIG. 2, the light guide strip 6 is connected with the first support part 41 by a first optically clear adhesive 7, and the light guide strip 6 is connected with the diffusion plate 32 by a second optically clear adhesive 8.

In specific implementation, in the above liquid crystal display device provided by the embodiments of the present disclosure, as shown in FIGS. 3-6, the back plate 2 further includes a third support part 23 connected with the side wall 22, the third support part 23 is arranged in parallel with the bottom wall 21, and the third support part 23 is located at the bottom of the first sub-support part 421.

As shown in FIGS. 3-6, the liquid crystal display device further includes an outer frame 9, where the outer frame 9 is fixedly connected with the side edge of the display panel 1 by a second adhesive layer 10, and the second adhesive layer 10 has iron powder. Compared with the solutions of FIGS. 1 and 2, the solutions of FIGS. 3-6 do not need coat a side sealant 13 (side sealing, which will be introduced later), so that the operation is more convenient and quick, the cost is reduced, and the production efficiency is effectively improved.

As shown in FIGS. 3-6, the liquid crystal display device further includes a magnetic strip 11, where the magnetic strip 11 is fixed on the third support part 23, and the magnetic strip 11 is configured to have an attractive force to the iron powder within the second adhesive layer 10. When the display panel 1 is attached to the backlight source 3 through the outer frame 9 and the middle frame 4, an ultra-narrow black matrix (BM) (e.g. 0.9 mm) full screen may be efficiently and firmly attached to the corresponding backlight source 3 by utilizing the attractive force between the magnetic strip 11 and the iron powder within the second adhesive layer 10 in the embodiments of the present disclosure.

In specific implementation, in the above liquid crystal display device provided by the embodiments of the present disclosure, the second adhesive layer is light shielding foam or a UV-curable adhesive, but is not limited thereto.

In specific implementation, in the above liquid crystal display device provided by the embodiments of the present disclosure, the first adhesive layer is double-sided adhesive foam or a UV-curable adhesive, but is not limited thereto.

In specific implementation, in the above liquid crystal display device provided by the embodiments of the present disclosure, as shown in FIGS. 1 and 2, by taking the first adhesive layer 5 being the UV-curable adhesive as an example, during assembly, the UV-curable adhesive may previously coat the first support part 41 of the middle frame 4 by a glue dispenser, and then the display panel 1 is placed above the first support part 41 after alignment by the alignment equipment, and the assembly of the module may be completed after UV glue curing.

In specific implementation, in the above liquid crystal display device provided by the embodiments of the present disclosure, as shown in FIGS. 3-6, the first adhesive layer 5 employs double-sided adhesive foam, which is cheaper than the UV-curable adhesive and can further reduce the cost. Since the double-sided adhesive foam material is soft, in order to ensure firm bonding, the second adhesive layer 10 (e.g., the UV-curable adhesive) with iron powder is coated in the gap between the outer frame 9 and the side edge of the display panel 1. This coating mode has low requirements for equipment accuracy and is easy to control, and there is no risk that glue overflows into the display panel 1.

Figure 3:
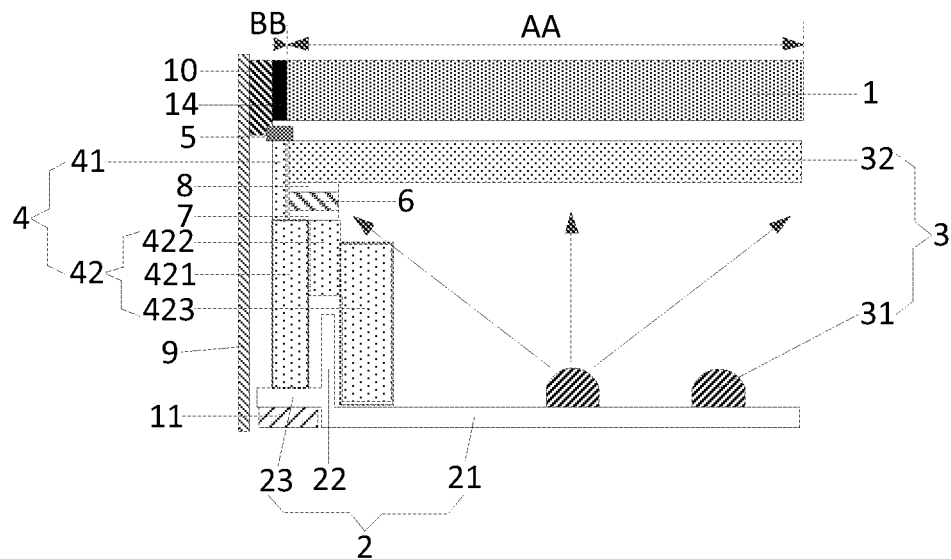
FIG. 3 is a structural schematic diagram of another liquid crystal display device provided by the embodiments of the present disclosure.
Figure 4:
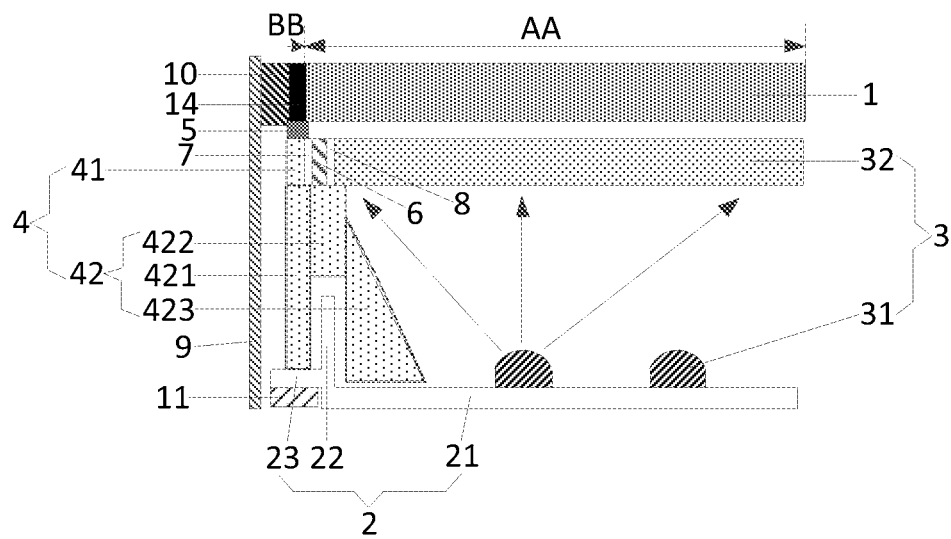
FIG. 4 is a structural schematic diagram of another liquid crystal display device provided by the embodiments of the present disclosure.

In specific implementation, in the above liquid crystal display device provided by the embodiments of the present disclosure, as shown in FIGS. 3 and 4, the magnetic strip 11 is located on one side, deviating from the first sub-support part 421, of the third support part 23; and a bottom surface of the magnetic strip 11 is flush with a bottom surface of the bottom wall 21 of the back plate 2. The setting of the position of the magnetic strip 11 in FIGS. 3 and 4 does not additionally increase the thickness of the liquid crystal display device.

Figure 5:
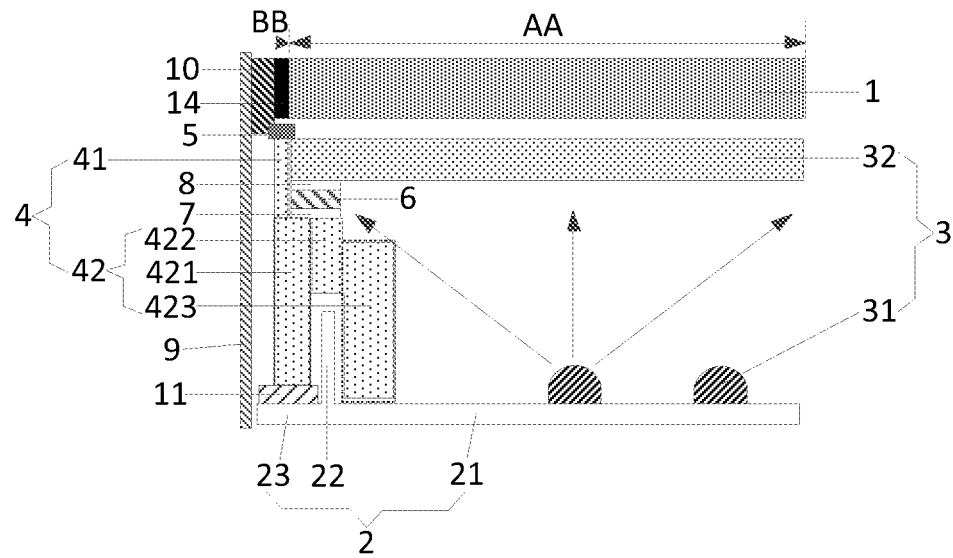
FIG. 5 is a structural schematic diagram of another liquid crystal display device provided by the embodiments of the present disclosure.
Figure 6:
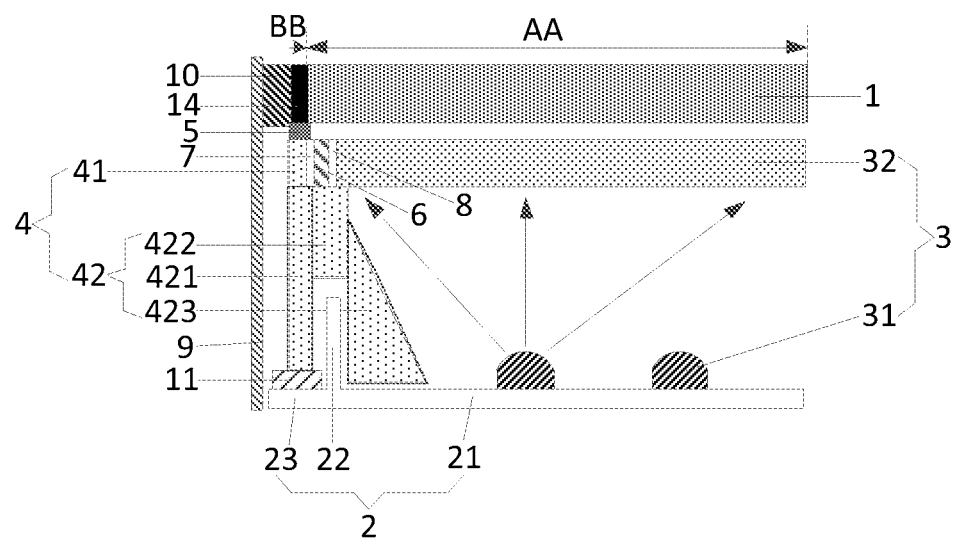
FIG. 6 is a structural schematic diagram of another liquid crystal display device provided by the embodiments of the present disclosure.
Figure 7:
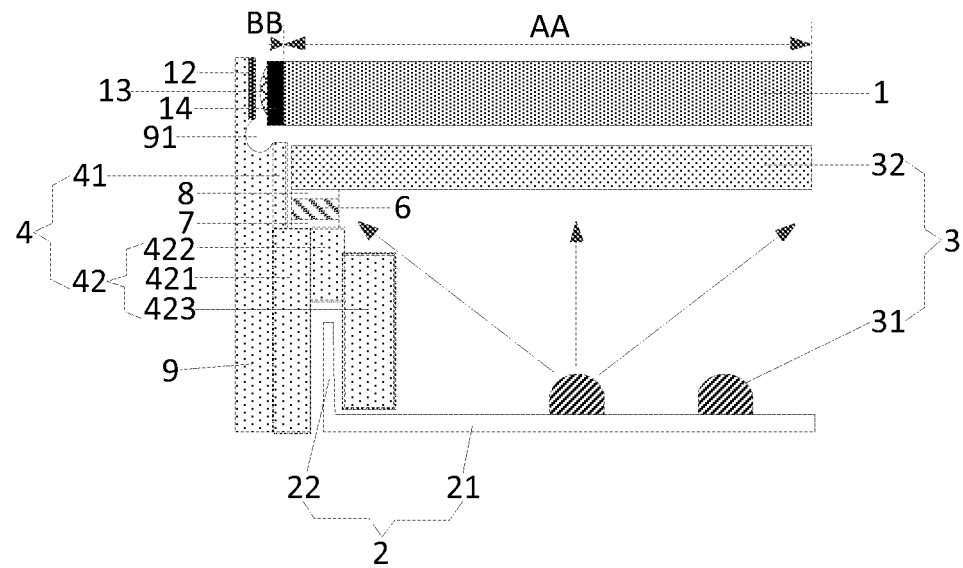
FIG. 7 is a structural schematic diagram of another liquid crystal display device provided by the embodiments of the present disclosure.
Figure 8:
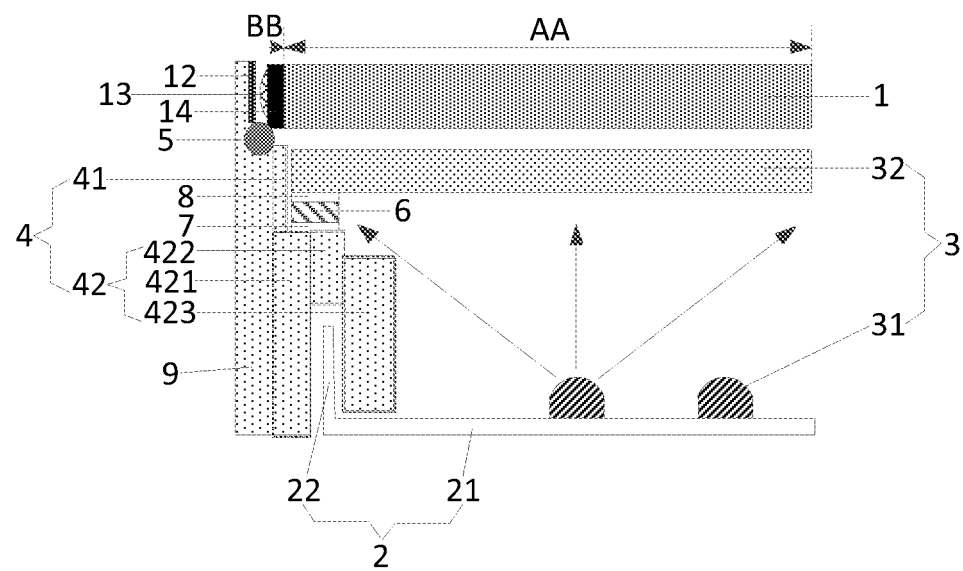
FIG. 8 is a structural schematic diagram of another liquid crystal display device provided by the embodiments of the present disclosure.
Figures 9, 10:
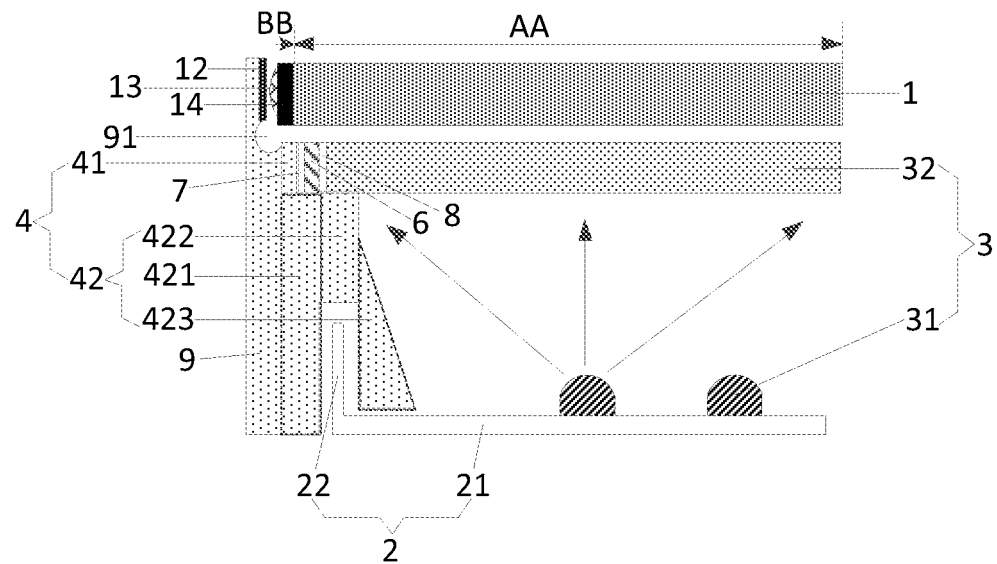
FIG. 9 is a structural schematic diagram of another liquid crystal display device provided by the embodiments of the present disclosure.
FIG. 10 is a structural schematic diagram of another liquid crystal display device provided by the embodiments of the present disclosure.

In specific implementation, in the above liquid crystal display device provided by the embodiments of the present disclosure, as shown in FIGS. 5 and 6, the magnetic strip 11 is located between the third support part 23 and the first sub-support part 421, and a bottom surface of the third support part 23 is flush with a bottom surface of the bottom wall 21 of the back plate 2. The setting of the position of the magnetic strip 11 in FIGS. 5 and 6 does not additionally increase the thickness of the liquid crystal display device.

In specific implementation, in the above liquid crystal display device provided by the embodiments of the present disclosure, as shown in FIGS. 1, 2, and 7-10, the liquid crystal display device further includes an outer frame 9; where an inner wall, facing the display panel 1, of the outer frame 9 has light shielding foam 12; a side edge of one side, facing the outer frame 9, of the display panel 1 has a side sealant 13; and the outer frame 9 is fixedly connected with the side edge of the display panel 1 by the light shielding foam 12 and the side sealant 13.

In specific implementation, in the above liquid crystal display device provided by the embodiments of the present disclosure, as shown in FIGS. 7-10, the middle frame 4 and the outer frame 9 are an integrated structure. In this way, the outer frame 9 is equivalent to an appearance part of the middle frame 4, i.e. when the middle frame 4 is fabricated, the thickness of the middle frame 4 in the horizontal direction and the vertical direction can be increased, which is equivalent to directly taking the upper edge of the middle frame 4 as the appearance part, so that the thickness of the liquid crystal display device can be reduced and the cost can be reduced.

In specific implementation, in the above liquid crystal display device provided by the embodiments of the present disclosure, as shown in FIGS. 7-10, a position where the side wall of the outer frame 9 is in lap joint with the top of the first support part 41 has a groove 91, and the first adhesive layer 5 is located within the groove 91. In this way, the first adhesive layer 5 can be efficiently coated in the groove 91, the assembly and alignment of the display panel 1 is more convenient, and the bonding is firm, so as to avoid that the glue overflows to the display region AA, and guarantee the picture display quality.

In specific implementation, in the above liquid crystal display device provided by the embodiments of the present disclosure, as shown in FIGS. 7-10, the groove 91 is arc-shaped, but is not limited thereto.

In specific implementation, in the above liquid crystal display device provided by the embodiments of the present disclosure, as shown in FIGS. 1-10, the material of the light guide strip 6 may be a polyethylene terephthalate (PET) substrate+a diffusion layer, i.e., the light guide strip 6, similar to a commonly used diffusion plate, may reach the effect of conducting diffused light rays, thereby effectively solving the problem that edge pixels of the display region AA of the display panel 1 are blocked.

It should be noted that the same film layers with the same reference signs in FIGS. 1-10 have the same structure and function.

In specific implementation, in order to reduce the thickness of the liquid crystal display device, in the above liquid crystal display device provided by the embodiments of the present disclosure, as shown in FIGS. 1-10, the thickness of the first optically clear adhesive 7 is 0.25-0.5 mm, and the thickness of the second optically clear adhesive 8 is 0.25-0.5 mm.

In specific implementation, in the above liquid crystal display device provided by the embodiments of the present disclosure, as shown in FIGS. 1-10, the non-display region BB of the display panel 1 includes a black matrix 14, the black matrix 14 is fixedly connected with the first support part 41 through the first adhesive layer 5, and the black matrix 14 has a width of 0.5-0.9 mm.

In specific implementation, in the above liquid crystal display device provided by the embodiments of the present disclosure, as shown in FIGS. 1-10, the light source 31 may be a light emitting diode (LED) lamp, and a plurality of LED lamps are arranged in an array on the bottom wall of the back plate 2, but is not limited thereto.

In specific implementation, in the above liquid crystal display device provided by the embodiments of the present disclosure, as shown in FIGS. 1-10, an optical film may also be arranged on the diffusion plate 32 to improve brightness and uniformity of light rays incident to the display panel 1.

In specific implementation, other structures known to those skilled in the art, such as flexible circuit boards, printed circuit boards, and the like, are also included in the above liquid crystal display device provided by the embodiments of the present disclosure.

The above liquid crystal display device provided by the embodiments of the present disclosure may be any product or component with a display function, such as a mobile phone, a tablet computer, a television set, a display, a notebook computer, a digital photo frame, a navigator, and the like. Other essential components of the liquid crystal display device should be understood by those of ordinary skill in the art and will not be described herein and should not be taken as a limitation of the present disclosure. The principle of solving the problem of the liquid crystal display device is similar to that of the aforementioned quantum dot light-emitting device, and thus the implementation of the liquid crystal display device can refer to the implementation of the aforementioned liquid crystal display device, and the repetition is not repeated here.

According to the liquid crystal display device provided by the embodiments of the present disclosure, by optimizing the structure of the middle frame, i.e. forming the first step structure by the first support part and the second sub-support part, and arranging the avoidance part for avoiding light emitted by the backlight source so that the light emitted by the backlight source is incident to the edge region of the diffusion plate, light rays emitted by the light source can be made to effectively reach the edge of a module, thereby avoiding the problem that the light rays are blocked.

While the preferred embodiments of the present disclosure have been described, those skilled in the art may make additional changes and modifications to these embodiments once they know the basic inventive concept. Therefore, the appended claims are intended to be interpreted as including preferred embodiments and all changes and modifications falling within the scope of the present disclosure.

Obviously, those skilled in the art can make various changes and modifications to the embodiments of the present disclosure without departing from the spirit and scope of the embodiments of the present disclosure. Thus, if these changes and modifications of the embodiments of the present disclosure fall within the scope of the claims of the present disclosure and its equivalent technology, the present disclosure is also intended to include these changes and modifications.

What is claimed is:

1. A liquid crystal display device, comprising:
   a display panel, comprising a display region and a non-display region surrounding the display region;
   a back plate, arranged opposite to the display panel, wherein the back plate comprises a bottom wall and a side wall extending from the bottom wall to one side of the display panel;
   a backlight source, arranged between the display panel and the back plate, wherein the backlight source comprises a light source arranged on the bottom wall of the back plate and a diffusion plate arranged on a light emitting side of the light source; and
   a middle frame, wherein the middle frame comprises a first support part, and a second support part connected with one side, deviating from the display panel, of the first support part;
   wherein the non-display region of the display panel is fixedly connected with the first support part by a first adhesive layer;
   wherein the second support part comprises:
      a first sub-support part connected with the one side, deviating from the display panel, of the first support part;
      a second sub-support part connected with a side edge, facing the light source, of the first sub-support part; and
      an avoidance part connected with a side edge, deviating from the first sub-support part, of the second sub-support part;
   wherein an accommodation space is formed between the first sub-support part and the avoidance part, and the side wall of the back plate is accommodated in the accommodation space;
   the first support part and the second sub-support part form a first step structure, and a maximum distance between a top of the avoidance part and a surface of the bottom wall of the back plate is less than a maximum distance between a top of the second sub-support part and the surface of the bottom wall of the back plate; and
   an edge region of the diffusion plate is fixed on the second sub-support part;
   wherein the back plate further comprises a third support part connected with the side wall, the third support part is arranged parallel to the bottom wall, and the third support part is arranged at the bottom of the first sub-support part;
   the liquid crystal display device further comprises an outer frame, wherein the outer frame is fixedly connected with a side edge of the display panel by a second adhesive layer, and the second adhesive layer has iron powder; and
   the liquid crystal display device further comprises a magnetic strip, wherein the magnetic strip is fixed on the third support part, and the magnetic strip is configured to have an attractive force to the iron powder within the second adhesive layer.

2. The liquid crystal display device of claim 1, further comprising a light guide strip;
   wherein the light guide strip is arranged between the diffusion plate and the second sub-support part,
   a cross section shape of the avoidance part is rectangular, and the avoidance part and the second sub-support part form a second step structure; and
   the light guide strip is configured to diffuse and guide light emitted by the light source to an edge of the display region of the display panel.

3. The liquid crystal display device of claim 2, wherein the light guide strip is connected with the second sub-support part by a first optically clear adhesive, and the light guide strip is connected with the diffusion plate by a second optically clear adhesive.

4. The liquid crystal display device of claim 1, further comprising a light guide strip;
   wherein the light guide strip is arranged between the diffusion plate and the first support part;
   a cross section of the avoidance part is a right triangle, and an inclined plane of the right triangle is close to the light source; and
   the light guide strip is configured to diffuse and guide light emitted from the diffusion plate to an edge of the display region of the display panel.

5. The liquid crystal display device of claim 4, wherein the light guide strip is connected with the first support part by a first optically clear adhesive, and the light guide strip is connected with the diffusion plate by a second optically clear adhesive.

6. The liquid crystal display device of claim 1, wherein the magnetic strip is arranged on one side, deviating from the first sub-support part, of the third support part; and
   a bottom surface of the magnetic strip is flush with a bottom surface of the bottom wall of the back plate.

7. The liquid crystal display device of claim 1, wherein the magnetic strip is arranged between the third support part and the first sub-support part; and
   a bottom surface of the third support part is flush with a bottom surface of the bottom wall of the back plate.

8. The liquid crystal display device of claim 1, wherein;
   an inner wall, facing the display panel, of the outer frame has light shielding foam;
   a side edge of the one side, facing the outer frame, of the display panel has a side sealant; and
   the outer frame is further fixedly connected with the side edge of the display panel by the light shielding foam and the side sealant.

9. The liquid crystal display device of claim 8, wherein the middle frame and the outer frame are an integrated structure.

10. The liquid crystal display device of claim 9, wherein a position where the side wall of the outer frame is in lap joint with a top of the first support part has a groove, and the first adhesive layer is arranged within the groove.

11. The liquid crystal display device of claim 10, wherein the groove is arc-shaped.

* * * * *